Oct. 13, 1942.　　　M. L. LOCKHART　　　2,298,574
CAMERA STRUCTURE
Filed Feb. 9, 1939　　　2 Sheets-Sheet 2
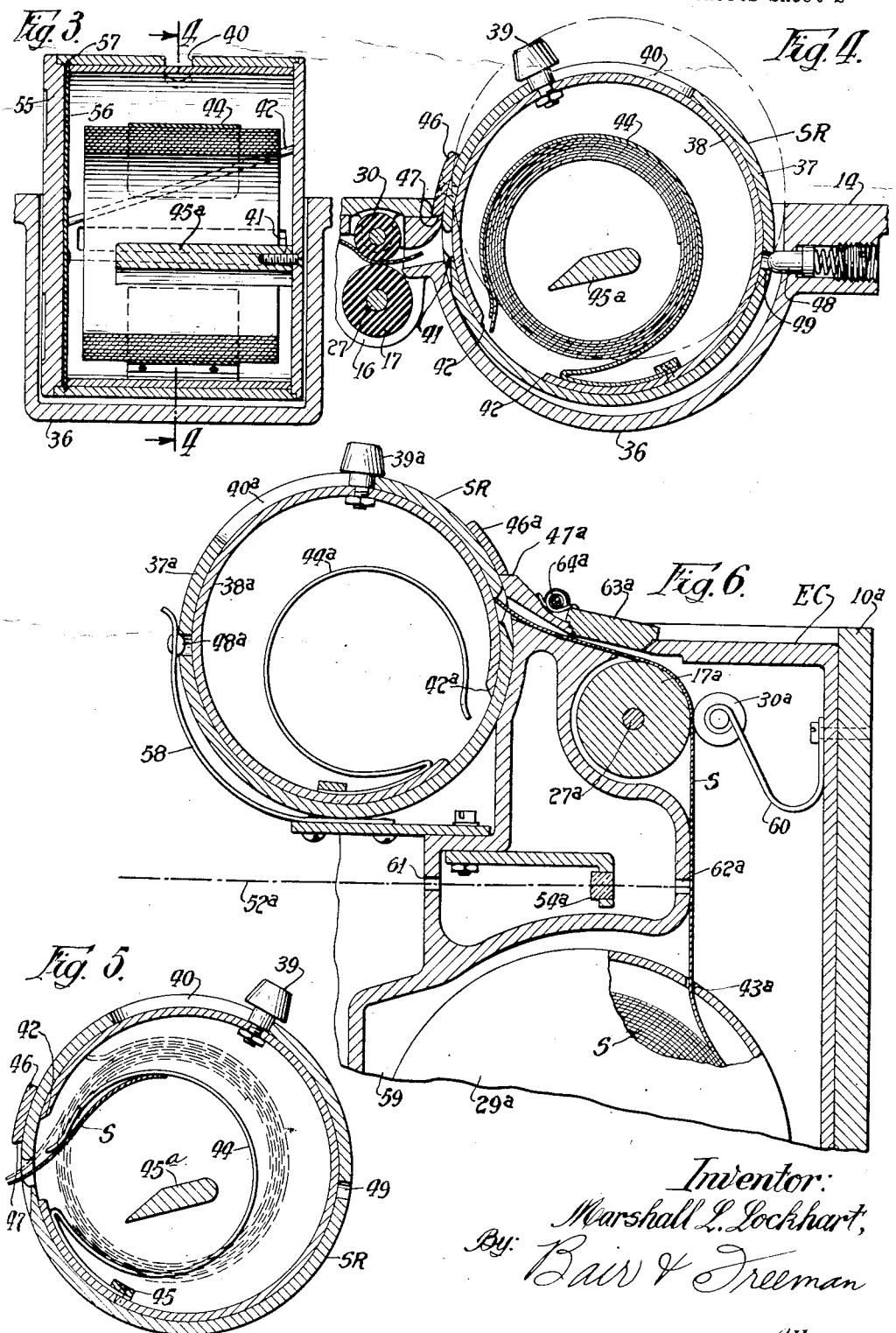

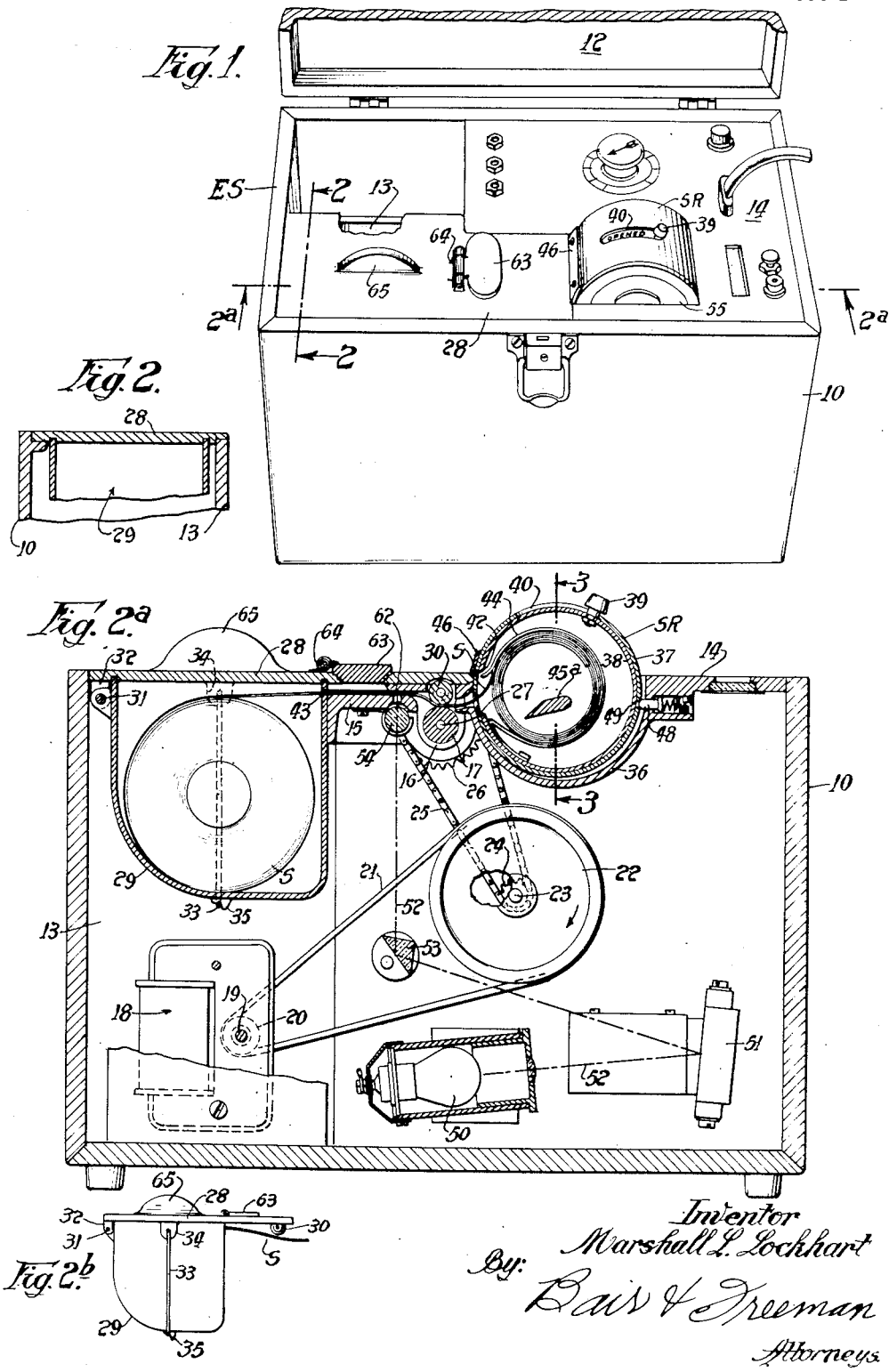

Patented Oct. 13, 1942

2,298,574

UNITED STATES PATENT OFFICE 2,298,574

CAMERA STRUCTURE

Marshall L. Lockhart, Ossining, N. Y.

Application February 9, 1939, Serial No. 255,539

9 Claims. (Cl. 242—71)

An object of my present invention is to provide a camera structure of simple and inexpensive construction particularly adapted for photographing deviations of a light beam or the like and designed to facilitate the operation of an electrostethograph of the type shown in my Patent No. 2,099,938, electrocardiographs and similar devices.

Another object is to provide a camera structure including a strip receiving receptacle for receiving sensitized photographic paper, film or the like after it has been exposed to the deviations of a light beam or to a shadow of a string galvanometer or the like, the film being propelled by a motor driven roller between which, and a pressure roller, the film travels, the motor driven roller effecting a thrusting action of the strip into the strip receptacle and a coiling of the strip therein into a roll.

A further object is to provide in the strip receptacle a curved leaf spring so shaped and arranged that it will guide the incoming strip and start it in the form of a roll and will expand as the roll expands without any undesirable binding, such as would cause buckling of the strip as it enters the strip receptacle.

Another object is to provide the receptacle in the form of a pair of telescoping cylinders oscillatable relative to each other and each having a slot to receive the strip, the edges of the slots constituting shearing means for cutting off the strip after the desired quantity thereof has been thrust into the strip receptacle.

Another object is to provide a light beam system arrangement which substantially confines the space required yet provides for the desired amplification of movement between a galvanometer and a recording strip as usually effected by a relatively long light beam system.

Still another object is to provide a camera structure which entirely eliminates the necessity of attaching the recording strip to a reel or the like and also eliminates intricate threading of a strip through guides, a strip storage box being so designed that the film extends therefrom and across a pressure roller supported thereby, the entire storage box, a cover plate for it and the pressure roller being removable as a unit from the machine and the recording strip, when the storage box is placed in position, in the machine automatically assuming its proper position between the pressure roller and a motor driven traction roller. The traction roller upon rotation effects propulsion of the recording strip.

Still another object is to provide a film receptacle so mounted in the housing of the machine that it is in the proper position to receive the propelled recording strip if the slots of the two cylinders are open, the arrangement being such that the strip receptacle is elevated out of the machine if the slots are inadvertently left closed, such elevation of the strip receptacle also being effected when the receptacle becomes filled with an excessive length of the strip.

Another object is to provide a socket or seat to receive the strip receptacle with resilient means engaging the receptable to normally hold it in position yet permit elevation of the strip receptacle out of its normal position upon undue pressure being applied to the strip being received in the receptacle.

Other objects, purposes and characteristic features of my present invention will be in part obvious from the attached drawings and in part pointed out as I proceed with the description of the invention in the following specification. In describing the invention in detail I will make reference to the accompanying drawings in which like reference characters designate corresponding parts throughout the several views and in which:

Figure 1 is a perspective view of an electrostethograph with my camera structure incorporated therein.

Figure 2 is a sectional view on the line 2—2 of Figure 1 showing how a recording strip storage box is supported in the housing of the electrostethograph.

Figure 2a is a sectional view on the line 2a—2a of Figure 1 showing a general view of the camera structure and its association with other parts of the machine.

Figure 2b is a front elevation of the storage box of the camera structure separated from the machine and shown on a reduced scale.

Figure 3 is an enlarged sectional view on the line 3—3 of Figure 2a showing internal details of a recording strip receptacle.

Figure 4 is an enlarged sectional view of a portion of Figure 2a to more clearly illustrate details of construction thereof and showing some of the parts in a different position.

Figure 5 is another sectional view similar to a portion of Figure 4 showing the parts in still another position and showing a recording strip started to form a roll within the strip receptacles; and Figure 6 is a vertical sectional view through a camera structure as applied to an electrocardiograph.

On the accompanying drawings I have used the reference character ES to indicate generally an electro-stethograph and EC an electrocardiograph. The electrostethograph ES includes a housing 10 having a lid 12. Within the housing 10 an intermediate wall 13 is provided and there is also provided a top wall 14.

Referring to Figure 2a, the housing 10 has therein a support 15 provided with bearings 16. A motor driven traction roller 17 is journaled in the bearings 16 and is driven by a motor 18. The motor 18 has a shaft 19 provided with a pulley 20. A belt 21 connects the pulley 20 with a pulley 22. The pulley 22 is mounted on a shaft 23. A sprocket 24 is operatively connected by a chain 25 to a sprocket 26. The sprocket 26 is secured to a shaft 27 on which the roller 17 is mounted.

A cover plate 28 having a handle 65 is mounted above the support 15 and as shown in Figure 2 is supported on the housing 10 and on the wall 13. A recording strip storage box 29 depends therefrom and a pressure roller 30 is supported by the cover plate. The parts 28, 29 and 30 are a separable unit with respect to the housing 10, this unit being shown detached in Figure 2b.

The storage box 29 is hinged to a rod 31 carried by ears 32 depending from the cover plate 28. To normally retain the storage box 29 closed a bail 33 is provided pivoted to ears 34. The ears 34 depend from the cover plate 28 and the bail 33 is adapted to coact with a notched lug 35 on the bottom of the storage box 29.

The top wall 14 is provided with a depressed socket-like seat 36 adapted to receive a strip receptacle SR. The strip receptacle comprises a pair of telescopic cylinders, the outer one being designated 37 and the inner one 38. The cylinders 37 and 38 are oscillatable relative to each other.

For imparting relative oscillation to the cylinders 37 and 38, a knob 39 projects from the inner cylinder 38 through a slot 40 in the outer cylinder. The cylinders 37 and 38 are respectively provided with a narrow slot 41 and a wide slot 42 having a slanting upper edge. When the slots 41 and 42 are in the position of Figure 4, they close the strip receptacle SR in a light tight manner and when they are in the position of Figures 2a and 5, they open the strip receptacle so that it may receive a recording strip S.

The recording strip S comes from a supply roll of strip in the storage box 29, first passing through a slot 43 thereof, then over the support 15 and then between the rollers 17 and 30. Within the strip receptacle SR I provide a leaf spring 44 having one end anchored as at 45. The spring 44 is curved on an arc of a circle and has its free end directed toward the slots 41 and 42 so as to guide the strip S as it initially enters the receptacle (see Figure 5) and causes the strip to form into a roll as it is thrust into the receptacle. As more of the strip enters the receptacle, the spring 44 expands by the friction of the strip against the spring and if for any reason the strip is crumpled or distorted, such expansion takes care of this fact by expanding.

Within the strip receptacle SR I provide a barrier 45a which serves as a deflector to aid in starting the strip in the proper direction. To keep the receptacle light tight at the point where the strip enters it, I provide a shield or stop bar 46 engageable against a shoulder 47 of the cover plate 28. Opposite the bar 46 a spring pressed plunger 48 engages an opening or depression 49 in the outer cylinder 37 to normally retain the strip receptacle in the seat 36. Whenever the receptacle becomes filled, however, or in case the slots 41 or 42 are left closed as in Figure 4, the strip S upon passing through the slot 41 and engaging the inner cylinder 38 will lift the strip receptacle to the dotted position shown in Figure 4 thus indicating to the operator that he has attempted to operate the camera structure without proper adjustment of the strip receptacle. If on the other hand he has opened the slots 41 and 42, then elevation of the strip receptacle out of the seat 36 serves as a notice that the receptacle is filled with the strip material.

The recording strip S it will be noted, travels in a substantially straight line from the storage box 29 to the receptacle SR. This eliminates the necessity of intricate threading of the strip through guides and eliminates excessive bending of the strip during propulsion thereof from the storage box into the strip receptacle. The arrangement is such that when the storage box unit shown in Figure 2b is placed in position it lays the recording strip on the traction roller 16 without special consideration from the operator.

In Figure 2a I have shown a light source consisting of a bulb 50. A reflecting galvanometer 51 reflects the beam 52 therefrom and it is again reflected by a prism 53 to a cylindrical lens 54. The lens 54 focuses the light beam on the recording strip between the slot 43 and the traction roller 17. This arrangement provides a comparatively long light beam path in a very condensed space.

For convenience in handling the recording strip after it has been exposed to the light beam 52, the strip receptacle SR is readily removable from the seat 36. It may then be taken to a dark room and opened. As shown in Figure 3, the receptacle has an end closure member 55. It is held in position by a leaf spring 56 entering bayonet slots 57. By rotating the end plate 55 to a position where the spring 56 registers with the outlet ends of the bayonet slots 57, the cover 55 may be removed from the receptacle. The roll of exposed recording strip may then be removed therefrom and developed.

The receptacle SR is readily returnable to its seat 36 and when the slots 41 and 42 are opened, the recording strip will properly enter and will start rolling up in the receptacle. The positions of the slots are accurately predetermined by co-action of the spring pressed plunger 48 with the opening 49 and the engagement of the bar 46 carried by the receptacle with the shoulder 47 of the cover plate. When the knob 39 of the receptacle is rotated to the proper position as shown in Figures 2a and 5, the leaf spring 44 is brought into its proper position to receive the strip S and cause it to properly be rolled up in the receptacle SR.

In Figure 6 many of the parts are similar to those already described in connection with Figure 2a. They accordingly bear the same reference numerals with addition of a. Instead of the plunger 48, a rivet 48a is provided which is carried by a leaf spring 58. A compartment 59 is provided in the electrocardiograph housing 10a and receives a film box 29a which is removable from the compartment 59. The film box 29a has a slot 43a through which the strip S is drawn to pass over the motor driven traction roller 17a.

The pressure roller 30a is carried by a leaf spring 60 mounted in the housing 10a.

The apparatus shown in Figure 6 is adapted for use with a string galvanometer (not shown) and the shadow of the string indicated at 52a moves transversely across a slot 61 and then passes through a lens 54a. The shadow then passes through a slot 62a and then falls on the strip S. Both forms of my invention may be provided with an autograph door 63 or 63a hinged in position and provided with coil springs 64 and 64a to normally retain them closed. The doors may be opened when it is desirable to autograph the strip S at the beginning of a recording.

I have provided a camera structure which is readily and quickly operable from the standpoint of removing exposed recording strip therefrom and supplying unexposed strip thereto. The strip may be conveniently cut off by manipulation of the knob 39 and inadvertent failure to open the slots 41 and 42 upon returning the strip receptacle to position on the machine will do no more harm than expose a short length of strip S as the receptacle SR will be elevated out of its normal position as soon as the roller 17 starts to operate. This will be indication to the operator to stop the motor. The parts are so arranged that light tight joints are present at all points where light would fog the strip if it were permitted to enter the camera. The renewal of recording strip may be effected in a minimum of time with a minimum of danger of undesired exposure of the recording strip.

In accordance with the provisions of the patent statutes I have described the principle of operation of my invention together with an illustration of camera structures which I consider to represent the best embodiments thereof. I desire it to be understood, however, that the structures disclosed are only illustrative and that the invention may be carried out by other means and mechanical equivalents falling within the scope of the appended claims.

What I claim as new and desire to secure by Letters Patent of the United States is:

1. In a camera structure for photographing on a sensitized strip, a support, a storage box for the strip, a strip receptacle having a slot to receive the strip from the storage box, said storage box and said strip receptacle being mounted on said support, said strip receptacle comprising an outer cylinder having a strip receiving opening, an inner cylinder having a strip receiving opening, a leaf spring in said inner cylinder and curved to a partial-cylindrical shape, means for anchoring one end of said leaf spring to said inner cylinder, the other end thereof being directed toward the incoming strip whereby said strip is received in said leaf spring and effects expansion thereof by frictional engagement of the strip with the spring as the size of the roll of strip is increased by additional strip material being thrust into said strip receptacle.

2. In a device of the class described, a support, a storage box for a recording strip, a strip receptacle to receive the strip from the storage box, said storage box and said strip receptacle being mounted on said support, said strip receptacle comprising a cylinder, an inner cylinder oscillatable therein, said cylinders having strip receiving openings, the edges of said openings constituting shearing means for the strip entering said strip receptacle when the inner strip is oscillated relative to the first mentioned cylinder, a leaf spring in said inner cylinder and curved on an arc of a circle, means for anchoring one end of said leaf spring to said inner cylinder, the other end thereof being directed toward the incoming strip whereby said strip is received in said leaf spring and effects expansion thereof by frictional engagement of the strip with the spring as the size of the roll of the strip is increased by additional strip material being thrust into said strip receptacle, said inner cylinder upon rotation to a position for opening said receptacle for reception of the strip effecting movement of the spring to proper strip receiving position.

3. In a camera structure, a cylindrical strip receptacle, a support therefor, said receptacle being supported by said support and having an opening to receive strip material, said support having a seat to receive said receptacle, an element in said seat opposite said opening to engage and support one side of said receptacle, shoulder means adjacent said opening to support the other side of said receptacle, means to guide said strip into said receptacle whereby it forms a roll therein, said receptacle including means to close said opening, the thrust of said strip into said receptacle being toward the portion of the receptacle outside of said seat and beyond a line connecting said element and said shoulder means to effect elevation of said receptacle out of said seat upon said strip engaging said last means.

4. In a camera structure, a cylindrical strip receptacle, a support therefor, said receptacle having an opening through the cylindrical wall thereof to receive strip material, said support having a semi-cylindrical seat, said receptacle being seated therein, said seat having an opening therein aligned with the opening of said receptacle when the receptacle is seated in the seat, an element in said seat opposite said openings to engage and support one side of said receptacle, shoulder means adjacent said openings to support the other side of said receptacle, means to guide said strip into said receptacle whereby it forms a roll therein, the thrust of said strip into said receptacle being toward the portion of the receptacle outside of said seat beyond a line connecting said element and shoulder means to effect elevation of said receptacle out of said seat upon the receptacle being completely filled, said receptacle including means to close the opening therein, said strip upon engaging said last means when it is inadvertently closed effecting elevation of said receptacle out of said seat.

5. In a camera structure, a strip receptacle, a support therefor, said strip receptacle having an opening to receive strip material, said support having a seat, said strip receptacle being seated therein, said seat having an opening registering with the opening of said receptacle, an element in said seat opposite said openings to support said strip receptacle at one side thereof, shoulder means adjacent said openings to support said strip receptacle at the opposite side thereof, resilient means causing said element to engage said strip receptacle to normally retain it received in said seat, means to guide said strip into said strip receptacle whereby it forms a roll therein, the thrust of said strip into said strip receptacle being toward the portion of the receptacle outside of said seat and beyond a line connecting said element and shoulder means to effect elevation of said receptacle out of said seat upon the receptacle becoming completely filled.

6. In a camera structure, a strip receptacle, a support therefor, said strip receptacle having an opening to receive strip material, said support having a seat, said strip receptacle being seated therein and having an opening registering with the opening of said receptacle, an element in said seat opposite said openings to support said strip receptacle at one side thereof, shoulder means adjacent said openings to support said strip receptacle at the opposite side thereof, means to guide said strip into said strip receptacle whereby it forms a roll therein, the thrust of said strip into said receptacle being toward the portion of the receptacle outside of said seat and beyond a line connecting said element and shoulder means to effect elevation of said receptacle out of said seat upon the receptacle becoming completely filled.

7. In a camera structure, a strip receptacle, a support therefor, said strip receptacle having an opening to receive strip material, said support having a seat, said strip receptacle being seated therein and having an opening aligned with the opening of said receptacle when the receptacle is seated in the seat, said receptacle having a light shield adjacent said opening to engage said support and form therewith a light tight joint, detent means in said seat, positioned substantially opposite said openings, and engaging said receptacle to retain one side thereof adjacent said light shield engaged with said seat at said openings and thereby maintain the light tight connection between said support and said receptacle, means to guide said strip into said strip receptacle whereby it forms a roll therein, the engagement of said shield with said support effecting proper positioning of said opening of said receptacle relative to said film guiding means.

8. In a camera structure, a strip receptacle, a support therefor, said support having a seat, said strip receptacle being seated therein, said strip receptacle and seat having registering openings through which strip material passes to the interior of the receptacle, said receptacle having a light shield adjacent said opening to engage said support and form therewith a light tight joint and to support one side only of said receptacle, means to guide said strip into said strip receptacle whereby it forms a roll therein, and detent means opposite said openings for supporting the other side of said receptacle.

9. In a camera structure, a strip receptacle, a support therefor, said strip receptacle being mounted on said support and having an opening to receive strip material, said support having an opening registering with the opening of said receptacle when mounted on said support, said strip receptacle having a light shield adjacent said openings to engage said support and form therewith a light tight joint, resilient detent means engaging said receptacle at a point substantially diametrically opposite said openings to retain said shield against said support and thereby maintain the light tight connection between said support and said receptacle, and means to guide said strip into se'd strip receptacle.

MARSHALL L. LOCKHART.